United States Patent [19]

Kim et al.

[11] Patent Number: 5,200,441

[45] Date of Patent: Apr. 6, 1993

[54] PROCESS FOR PREPARING THERMOPLASTIC RESINS

[75] Inventors: Young M. Kim; Chan H. Lee, both of Daejeon-si, Rep. of Korea

[73] Assignee: Lucky, Ltd., Seoul, Rep. of Korea

[21] Appl. No.: 749,870

[22] Filed: Aug. 26, 1991

[30] Foreign Application Priority Data

Aug. 28, 1990 [KR] Rep. of Korea ............... 90-13332

[51] Int. Cl.$^5$ .............................................. C08L 0/00
[52] U.S. Cl. ..................................... 523/221; 523/335; 524/504; 524/521; 525/71
[58] Field of Search ............... 523/221, 335; 524/504, 524/521; 525/71

[56] References Cited

U.S. PATENT DOCUMENTS

| | | | |
|---|---|---|---|
| 2,494,002 | 1/1950 | Rumbold | 523/221 X |
| 4,430,478 | 2/1984 | Schmitt et al. | 525/71 |
| 4,526,926 | 7/1985 | Weber et al. | 525/67 |
| 4,560,725 | 12/1985 | Van Bokhoven et al. | 525/67 |
| 4,840,990 | 6/1989 | Gullbins et al. | 524/504 |
| 4,868,235 | 9/1989 | Muehlbach et al. | 524/504 X |
| 4,965,315 | 10/1990 | Maeda et al. | 525/83 X |
| 4,975,473 | 12/1990 | Kaneda et al. | 523/221 |

Primary Examiner—Joseph L. Schofer
Assistant Examiner—J. M. Reddick
Attorney, Agent, or Firm—Michael N. Meller

[57] ABSTRACT

The present invention relates to a process for preparing thermoplastic resins having a high surface gloss and excellent impact resistance.

A process of the present invention comprises blending the graft polymer (D) having a grafting degree of 60~120% which is prepared by polymerizing an aromatic vinyl compound and a vinyl cyanide compund to 10~40% by weight of rubber latex (B) having 0.20~0.35$\mu$ of an average particle diameter, agglomerated by the shearing force, and the graft polymer (C) having a grafting degree of 25~45% which is prepred by polymerizing an aromatic vinyl compound and a vinyl cyanide compound to 40~80% by weight of rubber latex (A) having 0.25~0.40$\mu$ of an average particle diameter, agglomerated by the acidulation or made by the emulsion polymerization. In the said thermoplastic resins, the weight ratio of the latex (A) to the latex (B) is from 90/10 to 50/50.

3 Claims, No Drawings

PROCESS FOR PREPARING THERMOPLASTIC RESINS

FIELD OF THE INVENTION

The present invention relates to a process for preparing thermoplastic resins having a high surface gloss and excellent impact resistance.

BACKGROUND OF THE INVENTION

ABS resins are characterized by the balanced properties such as impact resistance, mechanical strength, moulding processability and a surface gloss so that they are widely used as parts of an automobile, electric and electronic appliances, office automated machines and electric home appliances. ABS resins having a high gloss are especially applied to parts requiring an excellent surface gloss.

Gloss of an ABS resin depends on rubber content, size and distribution of rubber particles. Rubbers having a small particle diameter have a high gloss while they have low impact resistance and low melt flow rate. Accordingly, in order to prepare thermoplastic resins having a high gloss and excellent impact resistance, it is necessary to mix rubber latices having a small particle diameter and rubber latices having a large particle diameter, appropriately.

Japanese Patent Publication No. (Sho)60/250057 described a process for preparing a thermoplastic resin after agglomeration the rubber latex having a small particle diameter in accordance with an agglomeration method using the shearing force of a homogenizer. However, according to this process, non-agglomerated particles having a small particle diameter are still remained due to the character of an agglomeration method using a homogenizer. Thus, if the rubber latex having a small particle diameter is used alone, the impact strength and the melt flow rate are lowered. Therefore, in order to solve these problems, the present invention has used a rubber latex having a large particle diameter (hereinafter referred to as "large-diameter latex") of $0.25 \sim 0.4\mu$ in combination with a rubber latex having a small particle diameter (hereinafter referred to as "small-diameter latex") while its gloss is maintained, and the impact strength and the melt flow rate are improved.

As a general agglomeration method, it is well known that dispersions of the rubber latices can be agglomerated by using acids, salts, freezing, solvents, high molecular weight agglomerating agents and high shear force (pressure agglomeration). Such an agglomeration method has its own characteristic. If a pressure agglomeration method is used, non-agglomerated rubber particles of at least 38% exist. Furthermore, if an acid agglomeration method is used, the rubber having a monodisperse distribution which has a narrow distribution, may be obtained.

Thus, the present inventors have controlled the distribution of particle diameter of whole rubber particles in order to obtain a high gloss due to the non-agglomerated rubber particles having a small particle diameter by a pressure agglomeration method and impact resistance due to the agglomerated rubber particles having a large particle diameter by an acid agglomeration method.

SUMMARY OF THE INVENTION

The present invention relates to a process for preparing thermoplastic resins having a high gloss and excellent impact resistance, which comprises following steps:
a) preparing the small diameter latex
b) agglomeration of the above latex
c) graft polymerization.

The object of this invention is to provide a process for preparing thermoplastic resins having a high gloss and excellent impact resistance.

DETAILED DESCRIPTION OF THE INVENTION

A process for preparing thermoplastic resins according to the present invention is as follows: the rubber latex having a small particle diameter of $0.06 \sim 0.15\mu$ and $75 \sim 95\%$ of gel, prepared by the emulsion polymerization, is agglomerated by the shearing force. The average particle diameter of this agglomerated latex (B) is about $0.20 \sim 0.35\mu$. Vinyl cyanide and aromatic vinyl compounds are added to this agglomerated latex, and polymerized. This obtained graft polymer (D) has a grafting degree of $60 \sim 120\%$. Furthermore, a rubber latex (A) having an average particle diameter of $0.25 \sim 0.4\mu$ is made by either acid agglomeration method or emulsion polymerization. To this rubber latex (A), vinyl cyanide and aromatic vinyl compounds are added, and polymerized. This graft polymer (C) has a grafting degree of $25 \sim 45\%$. These two (2) graft polymers latices are mixed to obtain the final resins having a high gloss and excellent impact resistance, in which the weight ratio of the latex (A) to the latex (B) in the whole rubber particles is $90/10 \sim 50/50$.

A process of the present invention is described in detail hereinbelow.

A) A preparation of a small-diameter latex

To 1,3-butadiene is added an emulsifier, an initiator, a chain transfer agent and water in a reactor, and then reacted at an internal temperature of 55° C. The reaction temperature is elevated to 60° C. if the conversion reaches 30%, and diethylhydroxylamine is added to the reaction mixture in order to stop the reaction if the conversion reaches 85%, and the unreacted monomers are recovered to obtain small-diameter latices.

The components of rubber latex used in the present invention may be butadiene monomer, or copolymers such as butadiene-styrene copolymer and butadieneacrylonitrile copolymer.

In order to meet the object of the present invention, the average diameter of latex is preferably $0.05 \sim 0.20\mu$, and it is difficult to prepare resins having high impact resistance if gel content of resins is over 95%.

The gel content is measured by the following method. The rubber latex is coagulated, washed with water, and then dried at 40° C. in vacuum oven for one (1) day. 1 g of the rubber is added to 100 g of toluene, allowed to stand the reaction mixture for 48 hours, and then measured contents of the dissolved and indissolved parts.

$$\text{Gel content (\%)} = \frac{\text{weight of gel}}{\text{weight of sample}} \times 100$$

B) A process for agglomerating a small diameter latex

The size and the distribution of agglomerated latex particles depend on various factors when the small-diameter latex is agglomerated. In case of the pressure agglomeration, the size and the distribution of latex particles are controlled by amount of emulsifier, temperature and pH of latex, amount of solid content, and agglomeration pressure. Furthermore, in case of the acidulation, the size and the distribution of latex particles are controlled by amount of acid, emulsifier and solid content of latex, respectively, and pH of latex.

C) Graft polymerization

In graft polymerization, the whole amount of each component may be added at once, or continuously added in parts. Aromatic vinyl compounds used in this graft polymerization are styrene, α-methyl styrene, vinyl toluene, and the like. As a vinyl cyanide compound, acrylonitrile and methacrylonitrile, and if necessary, acrylic acid, methacrylic acid and its unsaturated carbonic acid and ester such as its methyl, ethyl, propyl, n-butyl and isobutylester may be used.

As an initiator, the redox system consisting of the reducing agent and cumene hydroperoxide or diisopropylbenzene hydroperoxide, or persulfate may be used.

As a molecular weight controller, mercaptans such as t-dodecylmercaptan and n-dodecylmercaptan, terpenes, dipentene and halogenated hydrocarbon such as chloroform and carbon tetrachloride may be used.

As an emulsifier, rosinates such as potassium rosinate and sodium rosinate, fatty acid salts such as postassium oleate and sodium stearate, or alkyl aryl sulfonate may be used.

According to the present invention, the graft polymers having a different particle diameters are prepared, and these graft polymers are mixed together in an appropriate ratio. In this case, if the amount of the graft polymer used a large-diameter latex (A) is increased, the impact resistance is increased, and if the amount of the graft polymer used a small-diameter latex (B) which is agglomerated by the shearing force is increased, the surface gloss is increased.

Graft polymerization of the latex (B):

The content of latex (B) is controlled to 10~40%, and a vinyl cyanide compound and an aromatic vinyl compound are added to the latex (B) to obtain the graft polymer. At this time, the addition method of monomer may be selected from the methods mentioned previously.

According to the present invention, the monomers may be added by two steps. In the first step, the content of rubber is controlled to 10~40%, and 1/5 to ⅓ of the total amount of monomers are added together with an emulsifier and an initiator at once. The reaction temperature is elevated from 40° C. to 78° C. over 1 hour.

In the second step, remaining monomers are mixed with the emulsifier and the initiator to obtain an emulsion, and this emulsion is continuously introduced into the polymerization reactor for 3 hours. The reaction temperature is preferably 70°~80° C. The grafting degree of the polymer should be 60~120%. If the grafting degree is lower than the above value, the dispersion of rubber particles is not good, and thus the surface gloss of the resin is poor.

Measurement of the grafting degree:

2 g of the graft polymer powder are dissolved in 300 ml of acetone, and the solution is warmed up. Then, the solution is stirred for 24 hours. The solution is seperated with an ultracentrifuge, and the seperated acetone solution is added dropwisely into methanol to obtain the non-grafted SAN. The SAN is dried, and then weighed. The grafting degree is defined as follows:

$$\text{Grafting Degree (\%)} = \frac{\text{amount of grafted SAN}}{\text{weight of rubber}} \times 100$$

Graft polymerization of the latex (A):

The content of latex A is controlled to 40~80%, and the total amount of the monomers is added continuously thereto over 3 hours. The reaction temperature is 70°~80° C. The reaction is lasted for 1 hour after the addition of monomers is completed, and the reaction is then terminated. The grafting degree of the obtained graft polymer should be within the range of 25 to 45%.

The average particle diameter of the latex B used in this present invention should be within the range of 0.20~0.35μ, and the content of latex B in the whole rubber be 10 to 50%. The surface gloss becomes poor if the particle diameter is over 0.35μ and if the content of rubber (B) is below 10%. The impact resistance also deteriorated when the content of rubber (B) is over 50%. The thermoplastic resin having a high gloss and excellent impact resistance may be advantageously prepared when the content of vinyl cyanide compound in the monomer mixtures is 27~32% by weight.

To further illustrate the present invention, and not by way of limitation, the following examples are given.

PREPARATION EXAMPLES 1~5

To 100 parts by weight of 1,3-butadiene are added 3.3 parts by weight of potassium oleate as an emulsifying agent, 0.3 parts by weight of potassium persulfate as an initiator, 0.2 parts by weight of n-dodecylmercaptan as a chain transfer agent and 120 parts by weight of water in the reactor, and reacted at 55° C. The reaction temperature is elevated to 60° C. if the conversion reaches 30%, and diethylhydroxylamine is added to the reaction mixture in order to stop the reaction if the conversion reaches 85%, and the unreacted monomers are recovered to obtain small particle-diameter latices. The average particle diameter of the obtained rubber latices is 0.10μ, and the content of gel is 87%.

The gel content is measured by the following method. The rubber latex is coagulated by acid or salt, washed with water, and then dried at 40° C. in vacuum oven for one (1) day. 1 g of the rubber is added to 100 g of toluene, allowed to stand the reaction mixture for 48 hours, and then measured contents of the dissolved and the indissolved parts.

$$\text{Gel content (\%)} = \frac{\text{weight of gel}}{\text{weight of sample}} \times 100$$

The above small-diameter latex is agglomerated by acid in the following way. 100 parts by weight (solid part) of the small-diameter latex having an average particle diameter of 0.10μ are charged into the reactor, and 0.1 part by weight (solid part) of potassium rosinate is added thereto. Then, the mixture is stirred. 2.0 parts by weight of an aqueous acetic acid solution are added slowly thereto for about 1 hour, and 1.5 parts by weight (solid part) of potassium hydroxide are added to the mixture for 30 minutes so that the pH of latex is adjusted to 10. After the agglomeration is completed, the average particle diameter is measured to be 0.30μ. According to the pressure agglomeration method, 0.2 parts by weight (solid part) of potassium rosinate are added to 100 parts by weight (solid part) of the latex having an average particle diameter of 0.1μ and then charged into the homogenizer. A pressure of 2,000~7,000 psig is applied to the homogenizer, and the latex is agglomerated.

The particle diameter is measured by Autosizer IIc (Malvern Co.,). The average particle diameter and distribution of the agglomerated is shown in Table 1.

TABLE 1

| | Preparation Example | | | | |
|---|---|---|---|---|---|
| | 1 A | 2 B-1 | 3 B-2 | 4 B-3 | 5 B-4 |
| Average particle diameter of latex before agglomeration ($\mu$) | | | 0.1 | | |
| Temperature (°C.) | | | 25 | | |
| Agglomeration method | Acid method | Pressure method | | | |
| Amount of acid | 2.0 | — | — | — | — |
| Amount of emulsifier | 0.1 | 0.2 | 0.2 | 0.2 | 0.1 |
| Pressure (psig) | — | 2500 | 4000 | 7000 | 7000 |
| Average particle diameter of latex after agglomeration ($\mu$) | 0.30 | 0.20 | 0.25 | 0.30 | 0.37 |
| Distribution particle size | | | | | |
| (Weight %) | | | | | |
| over 0.2$\mu$ | 5 | 25 | 13 | 12 | 10 |
| 0.2~0.5$\mu$ | 85 | 68 | 67 | 66 | 63 |
| below 0.5$\mu$ | 10 | 7 | 20 | 23 | 27 |
| (Number %) | | | | | |
| over 0.2$\mu$ | 15 | 90 | 80 | 65 | 50 |
| 0.2~0.5$\mu$ | 80 | 8 | 12 | 20 | 30 |
| below 0.5$\mu$ | 5 | 2 | 8 | 15 | 20 |

EXAMPLE 1

1. Preparation of the graft polymer (C)

| 1st step: | |
|---|---|
| Agglomerated latex A | 60 parts |
| Potassium rosinate | 0.2 parts |
| Water | 115 parts |
| Tetrasodium pyrophosphate | 0.16 parts |
| Dextrose | 0.2 parts |
| Ferrous sulfate | 0.01 parts |

The above materials are charged into the reactor, and the reaction temperature is adjusted to 70° C. while stirring.

| 2nd step: | |
|---|---|
| Potassium rosinate | 0.1 parts |
| Styrene | 28 parts |
| Acrylonitrile | 12 parts |
| t-dodecylmercaptan | 0.3 parts |
| Water | 20 parts |
| Cumene hydroperoxide | 0.2 parts |

The emulsion obtained by mixing the above components is continuously charged into the reactor for 3 hours while the reaction temperature is slowly elevated from 70° to 80° C.

After the addition of emulsion is completed, the emulsion is further aged for 1 hour and the reaction is then terminated.

2. Preparation of the graft polymer (D)

| 1st step: | |
|---|---|
| Agglomerated latex B-1 | 20 parts |
| Potassium rosinate | 0.8 parts |
| Styrene | 20 parts |
| Acrylonitrile | 8 parts |
| t-dodecylmercaptan | 0.2 parts |
| Water | 110 parts |
| Tetrasodium pyrophosphate | 0.2 parts |
| Dextrose | 0.25 parts |
| Ferrous sulfate | 0.01 parts |
| Cumene hydroperoxide | 0.1 parts |

The above components are charged into the reactor, and the reaction temperature is slowly elevated from 40° to 70° C. over 1 hour.

| 2nd step: | |
|---|---|
| Potassium rosinate | 0.8 parts |
| Styrene | 36 parts |
| Acrylonitrile | 16 parts |
| t-dodecylmercaptan | 0.4 parts |
| Cumene hydroperoxide | 0.1 parts |
| Water | 50 parts |

The emulsion obtained by mixing the above components is continuously charged into the reactor over 3 hours, and the reaction temperature is slowly elevated from 70° to 80° C.

After the addition of emulsion is completed, the emulsion is further aged for 1 hour, and the reaction is then terminated.

3. Mixing process of latex

Graft polymer (C) latex and graft polymer (D) latex are mixed in the weight ratio (solid form) of 1:1. To this mixture is added an antioxidant, coagulated by 5% $H_2SO_4$ solution, and washed with water and then dried to obtain the white powder. The powder is mixed with styreneacrylonitrile copolymer containing 28~35 weight % of acrylonitrile content and having an average molecular weight of 70,000~90,000. The rubber content in the resin is adjusted to 15%, extruded at 200° C. and the injection moulding is carried out to obtain test specimens. The physical properties of the test specimen are measured and the results are shown in the following Table 2.

EXAMPLE 2

This procedure follows the process of Example 1, except that the agglomerated latex B-1 used in Example 1 is replaced by the agglomerated latex B-2 with the same amount.

EXAMPLE 3

This procedure follows the process of Example 1, except that the agglomerated latex B-1 used in Example 1 is replaced by the agglomerated latex B-3.

EXAMPLE 4

This procedure follows the process of Example 1, except that the mixing ratio (solid port) of the graft polymers (C) and (D) is 1:2.

EXAMPLE 5

This procedure follows the process of Example 4, except that the agglomerated latex B-1 used in Example 4 is replaced by the agglomerated latex B-2.

EXAMPLE 6

This procedure follows the process of Example 4, except that the agglomerated latex B-1 used in Example 4 is replaced by the agglomerated latex B-3.

content of the agglomerated latex B-1 in the whole rubber particles is below 10%.

The weight ratio (solid part) of the graft polymers (C) and (D) is controlled to 7:2 in the mixing step of the graft polymer latices.

TABLE 2

|  | Example 1 | Example 2 | Example 3 | Example 4 | Example 5 | Example 6 |
| --- | --- | --- | --- | --- | --- | --- |
| Notched izod impact strength, 23° C., (kg, cm/cm) | 17 | 22 | 25 | 24 | 18 | 20 |
| Melt index, 220° C., 10 kg, (g/10 min) | 23 | 29 | 30 | 29 | 24 | 26 |
| Surface gloss, 45° | 93 | 92 | 90 | 94 | 93 | 91 |
| Rockwell hardness, R-scale | 109 | 109 | 108 | 109 | 109 | 108 |
| Tensile strength (kg/cm$^2$) | 558 | 554 | 543 | 561 | 556 | 550 |
| Flexural modulus (kg/cm$^2$) | 26000 | 25000 | 25000 | 26000 | 25000 | 25000 |

|  | Comparative Example 1 | Comparative Example 2 | Comparative Example 3 |
| --- | --- | --- | --- |
| Notched izod impact strength 23° C., (kg, cm/cm) | 26 | 13 | 26 |
| Melt index, 220° C., 10 kg, (g/10 min) | 31 | 15 | 30 |
| Surface gloss, 45° | 85 | 96 | 84 |
| Rockwell hardness, R-scale | 108 | 109 | 107 |
| Tensile strength (kg/cm$^2$) | 540 | 565 | 540 |
| Flexural modulus (kg/cm$^2$) | 25000 | 26000 | 25000 |

COMPARATIVE EXAMPLE 1

The preparation of rubber latex is carried out with the pressure agglomeration method to obtain the agglomerated latex having over 0.35μ of an average particle diameter. This procedure follows the process of Example 1, except that the agglomerated latex B-1 used in Example 1 is replaced by the agglomerated latex B-4.

COMPARATIVE EXAMPLE 2

This procedure follows the process of Example 2, except that the average particle diameter of the agglomerated latex B-2 is in the range of 0.20~0.35μ, and the content of the agglomerated latex B-2 in the whole rubber particles is over 50%. The weight ratio (solid part) of the graft polymers (C) and (D) is controlled to 2:7 in the mixing step of these graft polymer latices.

COMPARATIVE EXAMPLE 3

This procedure follows the process of Example 1, except that the average particle diameter of the agglomerated latex B-1 is in the range of 0.20~0.35μ, and the

We claim:

1. A process for preparing thermoplastic resins having a high surface gloss and excellent impact resistance which comprises blending the graft polymer (D) having a grafting degree of 60~120% which is prepared by graft polymerizing an aromatic vinyl compound and a vinyl cyanide compound to 10~40% by weight of rubber latex (B) having 0.20~0.35μ of an average particle diameter, agglomerated by the shearing force, and the graft polymer (C) having a grafting degree of 25~45% which is prepared by graft polymerizing an aromatic vinyl compound and a vinyl cyanide compound to 40~80% by weight of rubber latex (A) having 0.25~0.40μ of an average particle diameter, agglomerated by the acidulation or made by the emulsion polymerization, with the proviso that in the thermoplastic resins, the weight ratio of the latex (A) to the latex (B) is from 90/10 to 50/50.

2. The process according to claim 1, wherein the content of gel in the said rubber latex is 75~95% by weight.

3. The process according to claim 1, wherein the content of the said vinyl cyanide compound in the graft polymer resin is 27~32% by weight.

* * * * *